US007098444B2

(12) United States Patent
Beinhocker

(10) Patent No.: US 7,098,444 B2
(45) Date of Patent: Aug. 29, 2006

(54) TAMPER PROOF CONTAINER

(76) Inventor: Gilbert D. Beinhocker, 36 Beatrice Cir., Belmont, MA (US) 02478

(*) Notice: Subject to any disclaimer, the term of this patent is extended or adjusted under 35 U.S.C. 154(b) by 0 days.

(21) Appl. No.: 10/837,883

(22) Filed: May 3, 2004

(65) Prior Publication Data

US 2005/0151067 A1 Jul. 14, 2005

Related U.S. Application Data

(60) Provisional application No. 60/535,449, filed on Jan. 9, 2004.

(51) Int. Cl.
*G01J 1/04* (2006.01)
*G01J 1/42* (2006.01)
*G01J 5/08* (2006.01)

(52) U.S. Cl. .......................... 250/227.14; 250/227.15; 250/474.1; 340/550; 385/12

(58) Field of Classification Search .............................. 250/227.14–227.18, 472.1, 474.1; 385/12, 385/13, 31, 114, 120; 340/541, 545.6, 550, 340/555–557, 571, 825.49
See application file for complete search history.

(56) References Cited

U.S. PATENT DOCUMENTS

| | | | | |
|---|---|---|---|---|
| 2,311,613 | A | 2/1943 | Slayter | |
| 3,320,114 | A | 5/1967 | Schulz | |
| 3,634,845 | A | 1/1972 | Colman | 340/274 |
| 3,714,644 | A | 1/1973 | Hellstrom | 340/274 |
| 3,947,837 | A | 3/1976 | Bitterice | 340/274 |
| 4,095,872 | A | 6/1978 | Stieff et al. | 350/96.24 |
| 4,161,348 | A | 7/1979 | Ulrich | 350/96.2 |
| 4,175,827 | A | 11/1979 | McMahon | 350/96.14 |
| 4,195,907 | A | 4/1980 | Zamja et al. | 350/96.32 |
| 4,217,488 | A | 8/1980 | Hubbard | 455/612 |
| 4,228,425 | A | 10/1980 | Cooke | 340/550 |
| 4,234,875 | A * | 11/1980 | Williams | 340/550 |

(Continued)

FOREIGN PATENT DOCUMENTS

DE 3720349 A1 * 12/1988

(Continued)

OTHER PUBLICATIONS

Bonner, Robert C., "Remarks of U.S. Customs Commissioner Robert C. Bonner*: U.S. Customs and Border Protection C-TPAT Conference San Francisco, California Oct. 30, 2003," http://www.cpb.gov/xp/cgov/newsroom/commissioner/speeches_statements/0ct302003.xml.

(Continued)

*Primary Examiner*—Thanh X. Luu
*Assistant Examiner*—Suezu Ellis
(74) *Attorney, Agent, or Firm*—Weingarten, Schurgin, Gagnebin & Lebovici LLP

(57) ABSTRACT

A liner sheet lines at least a portion of an interior surface of a shipping container or box and defines an optical path extending across at least a portion of the sheet, such that a breach of the interior surface also alters an optical characteristic of the optical path. For example, an optical fiber can be woven into, or sandwiched between layers of, the liner sheet. The optical path is monitored for a change in an optical characteristic. If the container or box interior surface is breached, one or more portions of the optical fiber are severed or otherwise damaged, and the optical path is altered. The detected change in the optical path can be used to trigger an alarm, such as an annunciator, or to send a message that includes information concerning the container's contents or time or location of the container when the breach occurred to a central location, such as a ship's control room or a port notification system.

59 Claims, 13 Drawing Sheets

U.S. PATENT DOCUMENTS

| | | | | |
|---|---|---|---|---|
| 4,297,684 | A | 10/1981 | Butter | 340/557 |
| 4,367,460 | A * | 1/1983 | Hodara | 340/550 |
| 4,447,123 | A | 5/1984 | Page et al. | 350/96.24 |
| 4,538,527 | A | 9/1985 | Kitchen | 109/21 |
| 4,603,252 | A | 7/1986 | Malek et al. | 250/227 |
| 4,772,092 | A | 9/1988 | Hofer et al. | 350/96.24 |
| 4,788,436 | A * | 11/1988 | Koechner | 250/485.1 |
| 4,867,820 | A | 9/1989 | Jacobson et al. | 156/101 |
| 4,931,771 | A | 6/1990 | Kahn | 340/556 |
| 4,935,723 | A | 6/1990 | Vallance | 340/550 |
| 4,972,176 | A | 11/1990 | Vallance | 340/550 |
| 5,049,855 | A | 9/1991 | Slemon et al. | 340/550 |
| 5,194,847 | A | 3/1993 | Taylor et al. | 340/557 |
| 5,309,533 | A | 5/1994 | Bonniau et al. | 385/11 |
| 5,355,208 | A | 10/1994 | Crawford et al. | 356/35.5 |
| 5,359,416 | A | 10/1994 | Mueller | 356/371 |
| 5,457,442 | A * | 10/1995 | Lucero | 340/693.1 |
| 5,568,124 | A | 10/1996 | Joyce et al. | 340/550 |
| 5,790,025 | A | 8/1998 | Amer et al. | 340/571 |
| 6,002,501 | A | 12/1999 | Smith et al. | 359/110 |
| 6,556,138 | B1 * | 4/2003 | Sliva et al. | 340/568.1 |
| 2002/0089434 | A1 | 7/2002 | Ghazarian | 340/988 |
| 2003/0151509 | A1 | 8/2003 | Iannotti et al. | 340/541 |
| 2003/0174059 | A1 | 9/2003 | Reeves | 340/573.4 |
| 2004/0037091 | A1 | 2/2004 | Guy | 362/582 |
| 2004/0046660 | A1 * | 3/2004 | Ando | 340/545.6 |
| 2004/0047142 | A1 | 3/2004 | Goslee | 362/84 |
| 2004/0056767 | A1 * | 3/2004 | Porter | 340/541 |
| 2004/0145499 | A1 * | 7/2004 | Schmidt et al. | 340/947 |
| 2004/0178880 | A1 * | 9/2004 | Meyer et al. | 340/5.22 |

FOREIGN PATENT DOCUMENTS

| | | | |
|---|---|---|---|
| GB | 2193825 | A * | 2/1988 |
| WO | WO 9311513 | A1 * | 6/1993 |

OTHER PUBLICATIONS

Brichard et al., "Gamma dose rate effect in erbium-doped fibers for space gyroscopes" IEEE (2003).

Kimura et al., "New Techniques to Apply Optical Fiber Image Guide to Nuclear Facilities," J. Nuc. Sci. and Tech., vol. 39, No. 6, pp. 603-706 (Jun. 2002).

Lu et al., "Gamma-induced attenuation in normal single-mode and multimode, Ge-doped and P-doped optical fibers: A fiber optic dosimeter for low dose levels," Can. J. Phys. 78, pp. 89-97 (May 11, 2000).

Nucsafe Inc., "Fiber Sensing Technology—The Long and Short of It," http://nucsafe.com/Puma/introduction.htm (2004).

Nucsafe Inc., "Why Neutrons," http://nucsafe.com/Puma/why_neutrons.htm, (2004).

Nucsafe Inc., "Guardian CRMS," http://nucsafe.com/Puma/guardian_crms.htm, pp. 1, 4-8 (2004).

Nucsafe Inc., "Fiber Facility," http://nucsafe.com/Puma/fiber_facilities.htm, pp. 1-2(2004).

Nucsafe Inc., "Detecting Neutrons," http://nucsafe.com/Puma/detecting_neutrons.htm, pp. 1-3(2004).

Nucsafe Inc., "Photonics," http://nucsafe.com/Puma/pr_photonicsspectra.htm, pp. 1-2 (2004).

Nucsafe Inc., "Tech Transfer," http://nucsafe.com/Puma/pr_techtransfer.htm, pp. 1-2(2004).

Nucsafe Inc., "Press Release—Frist Applauds Job Creation at Oak Ridge Based-Nucsafe," http://nucsafe.com/Puma/pr_knoxnews.htm, pp. 1-3 (2004).

Nucsafe Inc., "Optical Properties," http://nucsafe.com/Puma/properties_of_scintillating_fibe.htm, (2004).

Ott, Melanie N., "Radiation Effects Data on Commercially Available Optical Fiber: Database Summary," Radiation Effects Data Workshop 2002 IEEE.

Ott, Melanie N., "Radiation Effects Expected for Fiber Laser/Amplifier Rare Earth Doped Optical Fiber," NASA Survey Report (Mar. 2004).

Simpson, Doug, "US port security system set for launch," www.boston.com/news/nation/articles/2004/03/25/us_port_security_system_set_for_launch?mode=PF.

Poly-Optical Products "How does it work?" http://222.poly-optical.com/specifications.html pp. 1-15 2003.

U. S. Coast Guard, Navigation Center, What is the Automatic Identification System (AIS)? http://www.navcen.uscg.gov/enav/ais/how_ais_works.htm pp. 1-2 Nov. 2002.

U. S. Coast Guard, Navigation Center, What AIS Broadcasts http://www.navcen.uscg.gov/enav/ais/what_AIS_broadcasts.htm pp. 1-2 Mar. 2003.

U. S. Coast Guard, Navigation Center, "Types of Automatic Identification Systems", http://www.navcen.uscg.gov/enav/ais/types_of_AIS.htm pp. 1-2 Jan. 2004.

U. S. Coast Guard, Navigation Center, AIS Carriage Requirements , http://www.navcen.uscg.gov/enav/ais/AIS_carriage_reqmts.htm pp. 1-2 Feb. 2004.

U. S. Coast Guard, Navigation Center, "AIS Standards, Guidelines and Equipment Certification", http;//www.navcen.uscg.gov/enav/ais/AIS_standards.htm pp. 1-2 Jul. 2003.

* cited by examiner

TAMPER PROOF CONTAINER

CROSS-REFERENCE TO RELATED APPLICATIONS

This application claims the benefit of U.S. Provisional Application No. 60/535,449, titled "TAMPER PROOF CONTAINER," filed Jan. 9, 2004, the contents of which are hereby incorporated by reference herein.

STATEMENT REGARDING FEDERALLY SPONSORED RESEARCH OR DEVELOPMENT (Not Applicable)

BACKGROUND OF THE INVENTION

1. Field of the Invention

The present invention relates to security systems for shipping containers, boxes and the like and, more particularly, to such security systems that can detect tampering with, or breaches in, surfaces of such containers.

2. Description of the Prior Art

Cargo is often shipped in standardized containers, such as those used on trucks, trains, ships and aircraft. Smaller units of cargo are typically shipped in cardboard boxes and the like. It is often difficult or impossible to adequately guard these containers and boxes while they are in transit, such as on the high seas. In addition, some shipments originate in countries where port or rail yard security may not be adequate. Consequently, these containers and boxes are subject to tampering by thieves, smugglers, terrorists, and other unscrupulous people. A breached container can, for example, be looted or surreptitiously loaded with contraband, such as illegal drugs, weapons, explosives, contaminants or a weapon of mass destruction, such as a nuclear weapon or a radiological weapon, with catastrophic results.

Such breaches are difficult to detect. The sheer number of containers and boxes being shipped every day makes it difficult to adequately inspect each one. Even a visual inspection of the exterior of a container is unlikely to reveal a breach. Shipping containers are subject to rough handling by cranes and other heavy equipment. Many of them have been damaged multiple times in the natural course of business and subsequently patched to extend their useful lives. Thus, upon inspection, a surreptitiously breached and patched container is likely to appear unremarkable. Furthermore, many security professionals would prefer to detect breached containers prior to the containers entering a port and possibly preventing such containers from ever entering the port. The current method of placing a seal across the locking mechanism of a container door is of limited value, especially where a single breach can have catastrophic consequences.

BRIEF SUMMARY OF THE INVENTION

Embodiments of the present invention can detect a breach of the interior surface of a shipping container or box and can then trigger an alarm or notify a central location, such as a ship's control room or a port notification system. At least one liner sheet lines at least a portion of at least one interior surface of the shipping container or box, such that a breach of the portion of the interior surface also damages the liner sheet. The liner sheet defines an optical path extending across at least a portion of the sheet. The optical path is monitored for a change, such as a loss of continuity, in an optical characteristic of the optical path. If the container or box interior surface is breached, one or more portions of the optical path are affected and the optical path is broken or altered. The detected change in the optical path can be used to trigger an alarm, such as an annunciator. In addition, a message can be sent, such as by a wireless communication system, to a central location.

In another aspect of the invention the fiber can be constructed or coated with a material operative to detect certain types of nuclear or other radiation. A characteristic of the optical fiber is changed by incident radiation in the container in which the fiber is disposed to provide a detectable change in light transmission characteristics. Thus, the presence of certain types of radioactive material indicative of a nuclear device in the container can be sensed.

BRIEF DESCRIPTION OF THE SEVERAL VIEWS OF THE DRAWINGS

These and other features, advantages, aspects and embodiments of the present invention will become more apparent to those skilled in the art from the following detailed description of an embodiment of the present invention when taken with reference to the accompanying drawings, in which the first digit of each reference numeral identifies the figure in which the corresponding item is first introduced and in which.

DETAILED DESCRIPTION OF THE INVENTION

The present invention provides methods and apparatus to detect tampering with a six-sided or other type of container or box, as well as methods of manufacturing such apparatus. A preferred embodiment detects a breach in a monitored surface of a container or box. A liner sheet lines at least a portion of an interior surface of the container or box, such that a breach of the portion of the container interior surface damages the liner sheet. The liner sheet defines an optical path extending across at least a portion of the sheet. For example, an optical fiber can be woven into, or sandwiched between layers of, the liner sheet. The optical path is monitored for a change in an optical characteristic of the optical path. For example, a light source can illuminate one end of the optical fiber, and a light sensor can be used to detect the illumination, or a change therein, at the other end of the optical fiber. If the container or box surface is breached, one or more portions of the optical fiber are severed or otherwise damaged, and the optical path is broken or altered. The detected change in the optical path can be used to trigger an alarm, such as an annunciator. In addition, a message can be sent, such as by a wireless communication system, to a central location, such as a ship's control room or a port notification system. In some embodiments, as little as a single nick, cut, pinch, bend, compression, stretch, twist or other damage to the optical fiber can be detected, thus a single optical fiber can protect the entire volume of the container or box.

Figure 1:
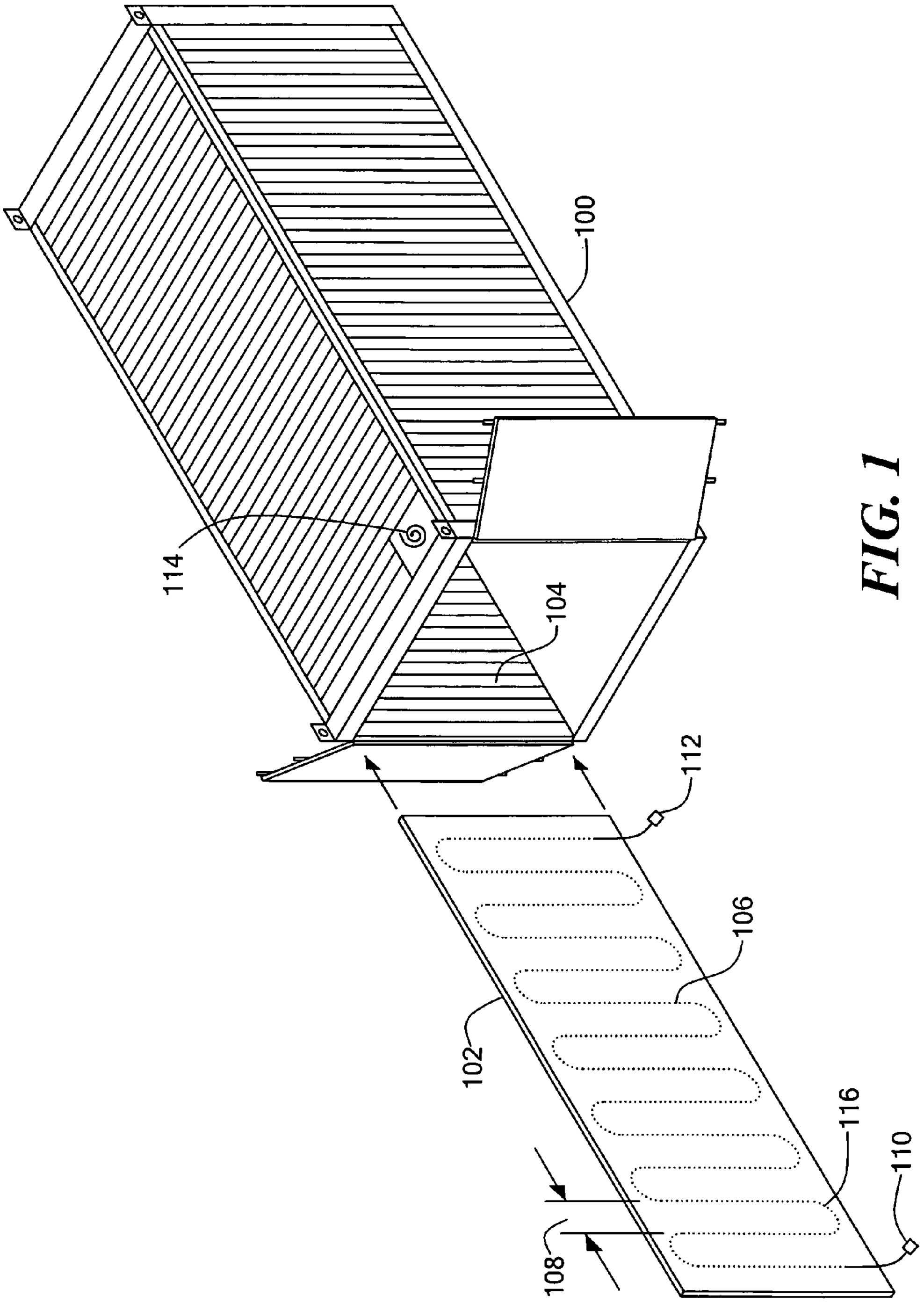
FIG. 1 is a perspective view of a liner sheet, according to one embodiment of the present invention, being inserted into a shipping container.

Embodiments of the present invention can be used in containers typically used to transport cargo by truck, railroad, ship or aircraft. FIG. 1 illustrates an embodiment of the present invention being inserted into one such container 100. In this example, the container 100 is an ISO standard container, but other types of containers or boxes can be used. The embodiment illustrated in FIG. 1 includes a rigid, semi-rigid or flexible panel 102 sized to correspond to an interior surface, such as an inside wall 104, of the container 100. The panel 102 can be slid into the container 100 and optionally attached to the inside wall 104, such as by eyelets or loops (not shown) on the panel and hooks, screws, bolts, toggles or other suitable fasteners (not shown) on the inside wall. Other attachment mechanisms, such as adhesives or hook-and-pile systems (commercially available under the trade name Velcro®) are also acceptable. In this manner, the panel 102 can later be removed from the container 100. In any case, the panel 102 can be removeably attached to the inside wall 104 or it can be permanently or semi-permanently attached thereto. Optionally, additional panels (not shown) can be attached to other interior surfaces, such as the opposite wall, ceiling, floor, end or doors, of the container 100. All these panels can be connected to a detection circuit, as described below. Alternatively, the container 100 can be manufactured with integral panels pre-installed therein.

As noted, the panel 102 is preferably sized to correspond to the surface to which it is to be attached. For example, an ISO standard 20-foot container has interior walls that are 19.3 ft long and 7.8 ft high. (All dimensions are approximate.) Such a container has a 19.3 ft. long by 7.7 ft wide floor and ceiling and 7.7 ft wide by 7.8 ft. high ends. An ISO standard 40-foot container has similar dimensions, except each long interior dimension is 39.4 ft. ISO standard containers are also available in other lengths, such as 8 ft., 10 ft., 30 ft. and 45 ft. Containers are available in several standard heights, including 4.25 ft. and 10 ft. Other embodiments can, of course, be used with other size containers, including non-standard size containers. The panel 102 is preferably slightly smaller than the surface to which it is to be attached, to facilitate installation and removal of the panel.

The panel 102 includes an optical fiber 106 extending across an area of the panel. The optical fiber 106 can be positioned serpentine- or raster-like at regular intervals, as indicated at 108. A "pitch" can be selected for this positioning, such that the spacing 108 between adjacent portions of the optical fiber 106 is less than the size of a breach that could compromise the security of the container. Alternatively, the optical fiber 106 can be distributed across the panel 102 according to another pattern or randomly, examples of which are described below. In other embodiments, the panel 102 can be eliminated, and the optical fiber can be permanently or removeably attached directly to the interior surface of the container 100. For example, adhesive tape can be used to attach the optical fiber to the interior surface. The optical fiber can be embedded within the adhesive tape and dispensed from a roll, or the optical fiber and adhesive tape can be separate prior to installing the optical fiber. In yet other embodiments, the container 100 is manufactured with optical fibers attached to its interior surfaces or sandwiched within these surfaces.

Optical connectors 110 and 112 are preferably optically attached to the ends of the optical fiber 106. These optical connectors 110 and 112 can be used to connect the panel 102 to other panels (as noted above and as described in more detail below) or to a circuit capable of detecting a change in an optical characteristic of the optical fiber. The optical connectors 110 and 112 can be directly connected to similar optical connectors on the other panels or the detector circuit. Alternatively, optical fiber "extension cords" can be used between the panel and the other panels or detector circuit.

Figure 2:
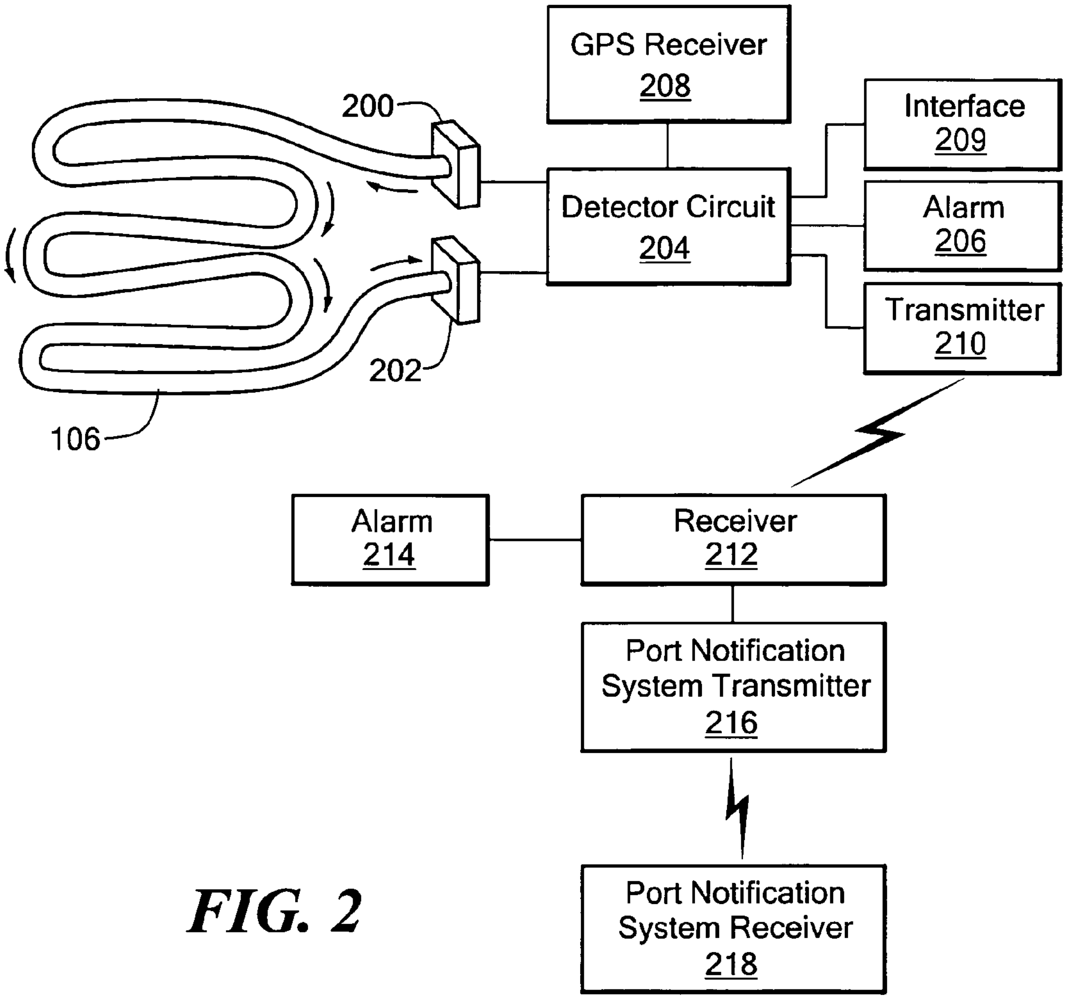
FIG. 2 is a simplified schematic diagram of major and optional components of a monitoring system, according one embodiment of the present invention.

As noted, a detector circuit is configured to detect a change in an optical characteristic of the optical fiber 106. As shown in FIG. 2, one end of the optical fiber 106 is optically connected (such as via optical connector 110) to a visible or invisible light source 200. The other end of the optical fiber 106 is connected to a light detector 202. The light source 200 and light detector 202 are connected to a detector circuit 204, which is configured to detect a change in the optical characteristic of the optical fiber 106. For example, if the light source 200 continuously illuminates the optical fiber 106 and the optical fiber is severed or otherwise damaged as a result of a breach of the container 100, the light detector 202 ceases to detect the illumination and the detector circuit 204 can trigger an alarm. Thus, the detector circuit 204 can trigger the alarm if the optical characteristic changes by a predetermined amount.

The change in the optical characteristic need not be a total change. For example, in transit, as cargo shifts position within the container 100, some cargo might partially crush, compress, twist, stretch or stress the panel 102 and thereby reduce, but not to zero, the light-carrying capacity of the optical fiber 106. To accommodate such a situation without sounding a false alarm, the detector circuit 204 can trigger the alarm if the amount of detected light falls below, for example, 30% of the amount of light detected when the system was initially activated. Optionally, if the system detects a reduction in light transmission that does not exceed such a threshold, the system can send a signal indicating this reduction and warning of a likely shift in cargo or some environmental deterioration of the panel, as opposed to a breach of the container 100.

In another aspect of the invention the fiber can be constructed or coated with a material operative to detect certain types of nuclear or other radiation. A characteristic of the optical fiber is changed by incident radiation in the container in which the fiber is disposed to provide a detectable change in light transmission characteristics which is detected as a rudimentary indication of radiation presence. Thus, the presence of certain types of radioactive material indicative of a nuclear device in the container can be sensed. The radiation may be of various types including alpha, beta, neutron, gamma, or certain other types of electromagnetic radiation. The degree of sensed radiation would not usually be measured in the present system but only the presence or absence of radiation above a meaningful threshold would be detected as an indication of the presence of a radioactive or other radiation emitting material or device.

The detector circuit 204 and other components of the tamper detection system that reside in the container 100 can be powered by a battery, fuel cell, thermocouple, generator or other suitable power supply (not shown). Preferably, the power supply is disposed within the protected portion of the container, so the power supply is protected by the tamper detection system. A reduced light signal can forewarn of a pending failure of the power supply or attempt at defeating the tamper detection system. If power is lost, an appropriate alarm signal can be sent.

Alternatively, rather than continuously illuminating the optical fiber 106, the detector circuit 204 can control the light source 200 to provide modulated or intermittent, for example pulsed, illumination to the optical fiber 106. In this case, if the light detector 202 ceases to detect illumination having a corresponding modulation or intermittent character, or if the light detector detects light having a different modulation or a different intermittent character, the detector circuit 204 can trigger the alarm. Such non-continuous illumination can be used to thwart a perpetrator who attempts to defeat the tamper detection system by illuminating the optical fiber with a counterfeit light source.

The detector circuit 204 can be connected to an alarm 206 located within the container 100, on the exterior of the container, or elsewhere. The alarm 206 can be, for example, a light, horn, annunciator, display panel, computer or other indicator. Optionally, the detector circuit 204 can be connected to a global positioning system (GPS) 208 or other location determining system. If so connected, the detector circuit 204 can ascertain and store geographic location, and optionally time, information when it detects a breach or periodically. The detector circuit 204 can include a memory (not shown) for storing this information. The detector circuit 204 can also include an interface 209, such as a keypad, ID badge reader, bar code scanner or a wired or wireless link to a shipping company's operations computer, by which information concerning the cargo of the container 100 can be entered. This information can include, for example, a log of the contents of the container 100 and the locations of the container, when these contents were loaded or unloaded. This information can also include identities of persons who had access to the interior of the container 100. Such information can be stored in the memory and provided to other systems, as described below.

Figure 3:
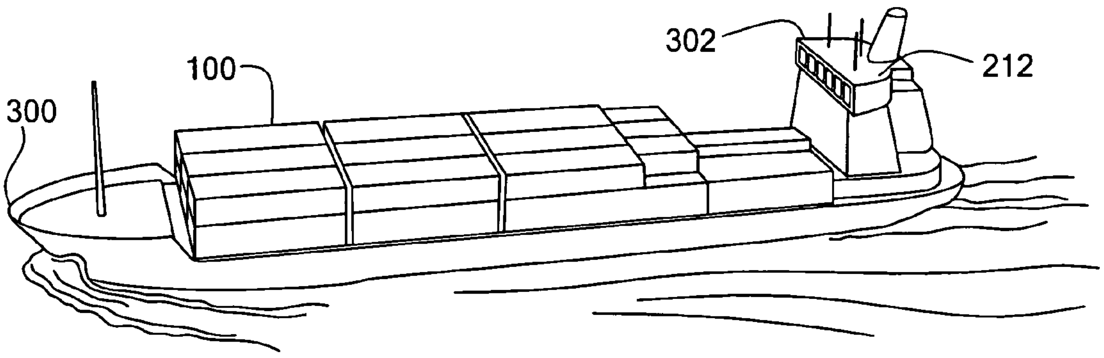
FIG. 3 is a perspective view of one context in which embodiments of the present invention can be advantageously practiced.

Optionally or in addition, the detector circuit 204 can be connected to a transmitter 210, which sends a signal to a receiver 212 if the detector circuit detects a change in the optical characteristic of the optical fiber 106. An antenna, such as a flat coil antenna 114 (FIG. 1) mounted on the exterior of the container 100, can be used to radiate the signal sent by the transmitter 210. The receiver 212 can be located in a central location or elsewhere. In one embodiment illustrated in FIG. 3, the container 100 is on board a ship 300, and the receiver 212 is located in a control room 302 of the ship. Returning to FIG. 2, the receiver 212 can be connected to an alarm 214 (as described above) located in a central location, such as the ship's control room 302, or elsewhere.

Some ships are equipped with automatic wireless port notification systems, such as the Automatic Identification System (AIS), that notify a port when such a ship approaches the port. Such a system typically includes an on-board port notification system transmitter 216 and a receiver 218 that is typically located in a port. The present invention can utilize such a port notification system, or a modification thereof, to alert port officials of a breached container and optionally of pertinent information concerning the container, such as its contents, prior locations, times of loading/unloading, etc. The receiver 212 can store information it has received from the transmitter 210 about any containers that have been breached in transit. This information can include, for example, an identity of the container, the time and location when and where the breach occurred, etc. The receiver 212 can be connected to the port notification transmitter 216, by which it can forward this information to the port at an appropriate time or to a terrorism monitoring system in real time. Other communication systems, such as satellite communication systems, can be used to forward this information, in either real time or batch mode, to other central locations, such as a shipping company's operations center.

Alternatively or in addition, the transmitter 210 can communicate directly with a distant central location, such as the port or the shipping company's operations center. In such cases, a long-range communication system, such as a satellite-based communications system, can be used. In another example, where the container is transported over land or within range of cellular communication towers, cellular communication systems can be used. Under control of the detector circuit 204, the transmitter 210 can send information, such as the identity of the container and the time and location of a breach, to the central location. Optionally, the transmitter 210 can send messages even if no breach has been detected. For example, the detector circuit 204 can test and monitor the operational status of the tamper detection system. These "heart beat" messages can indicate, for example, the location and status of the tamper detection system, such as condition of its battery or status of an alternate power supply, such as remaining life of a fuel cell, or location of the container. Such periodic messages, if properly received, verify that components external to the container, such as the antenna 114, have not been disabled.

Figure 4:
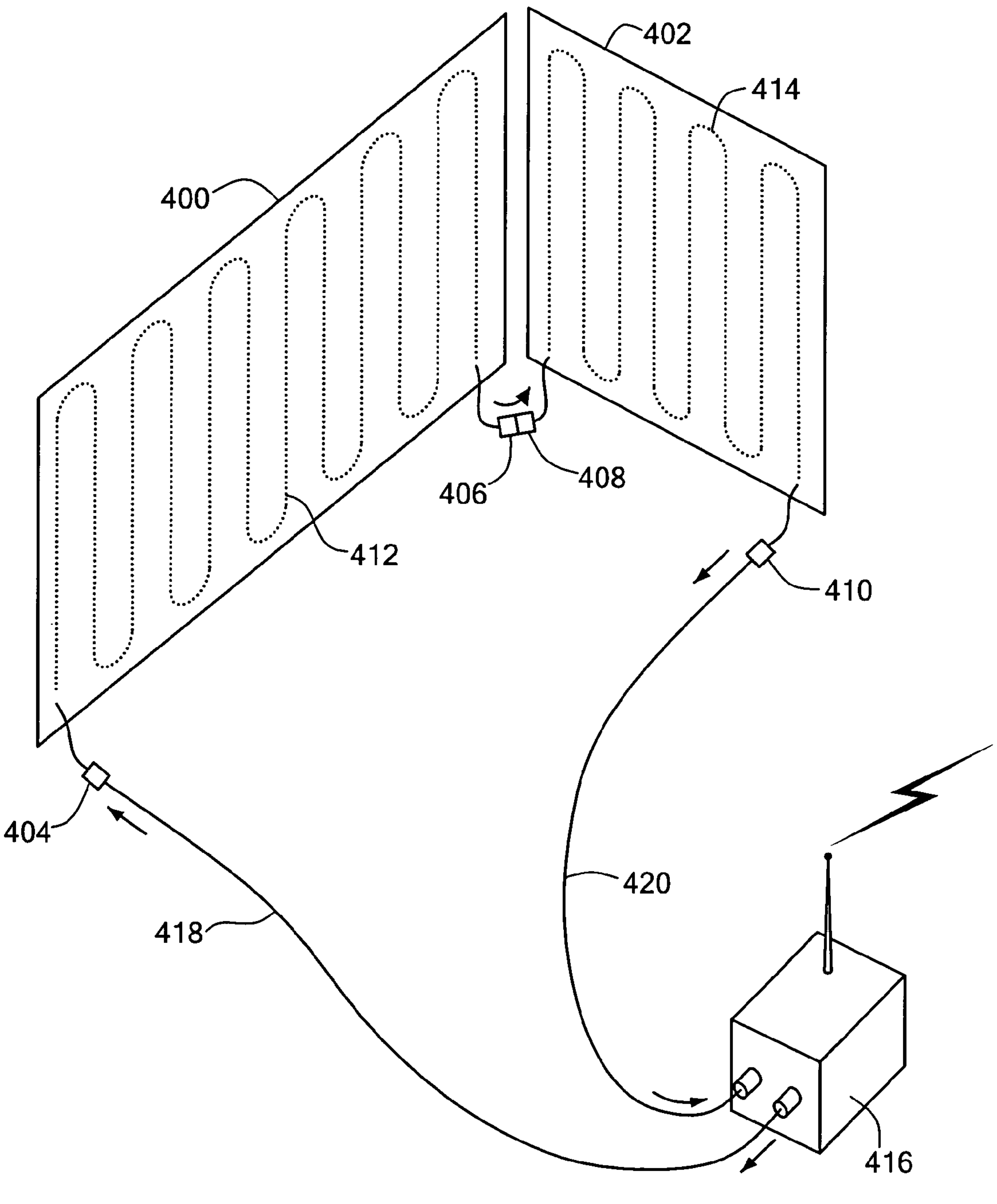
FIG. 4 is a perspective view of two liner sheets connected together, according to another embodiment of the present invention.

As noted above, and as shown in FIG. 4, several liner sheets, examples of which are shown at 400 and 402, can be connected together to monitor several interior surfaces of a container or to monitor a large area of a single surface. These liner sheets 400–402 preferably include optical connectors 404, 406, 408, and 410. Optical paths, for example those shown at 412 and 414, defined by the liner sheets 400–402 can be connected together and to the detector circuit 204 and its associated components (shown collectively in a housing 416) via the optical connectors 404–410. Optical fiber "extension cords" 418 and 420 can be used, as needed. If the optical paths 412–414 were connected together in series, a breach of any liner sheet 400 or 402 would trigger an alarm.

The intensity of the input light and the sensitivity of the detector can be such that no amplifiers or repeaters are necessary along the optical path for a simple yes/no determination of breach of the container. Alternatively, each panel or a group of panels can have a respective optical path and associated light source and detector, such that a breach of the optical path of the container panels can be identified with a particular panel or side of the container.

Figure 5:
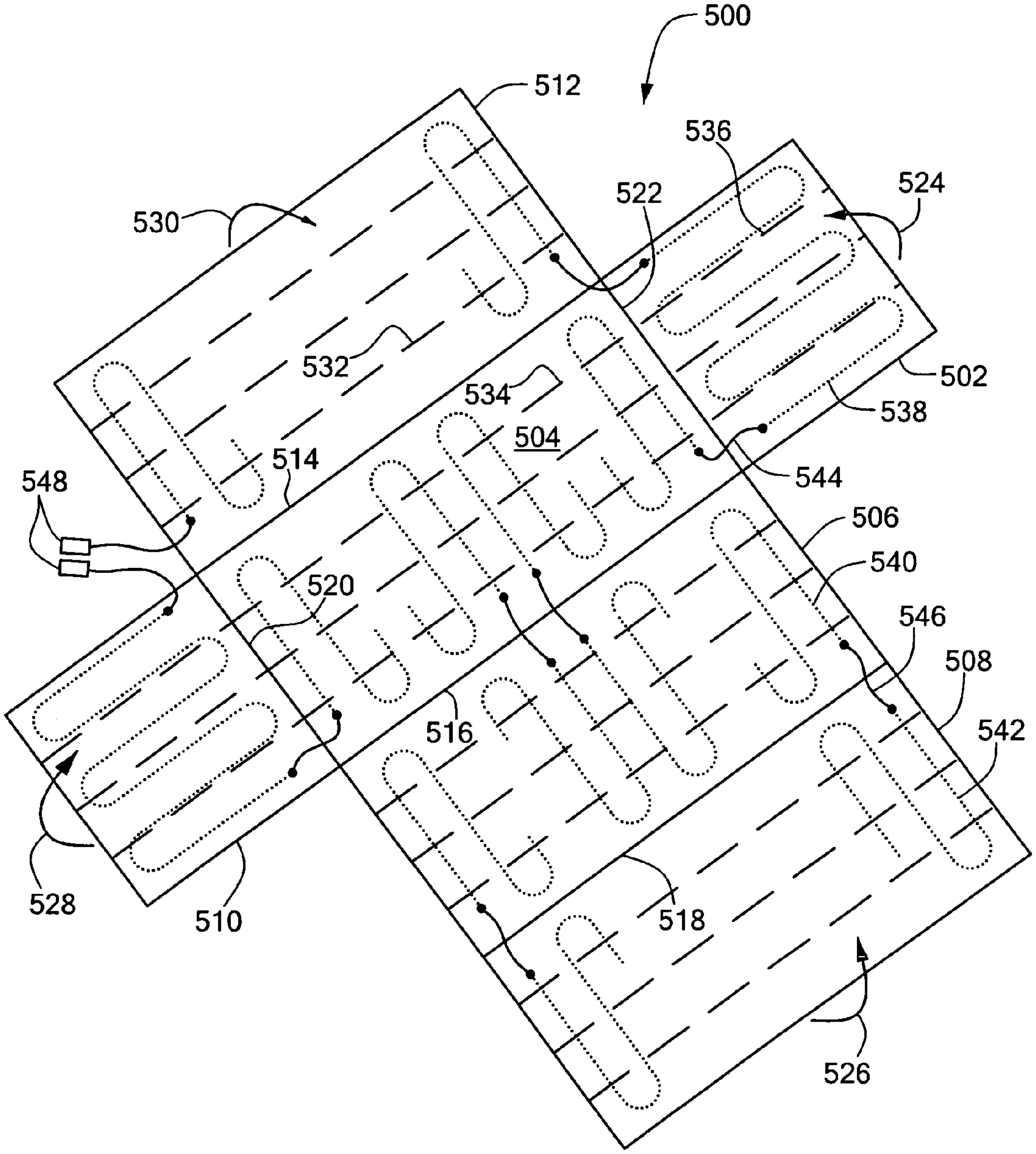
FIG. 5 is a perspective view of a six-panel, hinged liner sheet, according to another embodiment of the present invention.

In another embodiment illustrated in FIG. 5, a single liner sheet 500 can include several hinged panels 502, 504, 506, 508, 510, and 512. The panels 502–512 can be folded along hinges 514, 516, 518, 520, and 522 (as indicated by arrows 524, 526, 528, and 530) to form a three-dimensional liner for a container. Once folded, the liner sheet 500 can, but need not, be self-supporting and thus need not necessarily be attached to the interior surfaces of the container. For example, hinged panel 512 (which corresponds to a side of the container) can attach to hinged panel 508 (which corresponds to a ceiling of the container) by fasteners (not shown) mounted proximate the respective edges of these panels. Similarly, hinged panels 502 and 510 (which correspond to ends of the container) can attach to hinged panels 506, 508, and 512.

Preferably, the hinged panels 502–512 are each sized according to an interior surface of a container, although the panels can be of other sizes. Before or after use, the liner sheet 500 can be unfolded and stored flat. Optionally, the liner sheet 500 can be folded along additional hinges (such as those indicated by dashed lines 532, 534, and 536) for storage. These additional hinges define hinged sub-panels.

As shown, optical fibers in the hinged panels 502–512 (such as those shown at 538, 540, and 542) can be connected together in series by optical jumpers (such as those shown at 544 and 546). A single set of optical connectors 548 can be used to connect the liner sheet 500 to a detector circuit or other panels. Alternatively, additional optical connectors (not shown) can be connected to ones or groups of the optical fibers. The liner sheet 500 has six panels 502–512 to monitor the six interior surfaces of a rectangular container. Other numbers and shapes of panels are acceptable, depending on the interior geometry of a container, the number of surfaces to be monitored, and the portion(s) of these surfaces to be monitored. It is, of course, acceptable to monitor fewer than all the interior surfaces of a container or less than the entire area of any particular surface.

Figure 6:
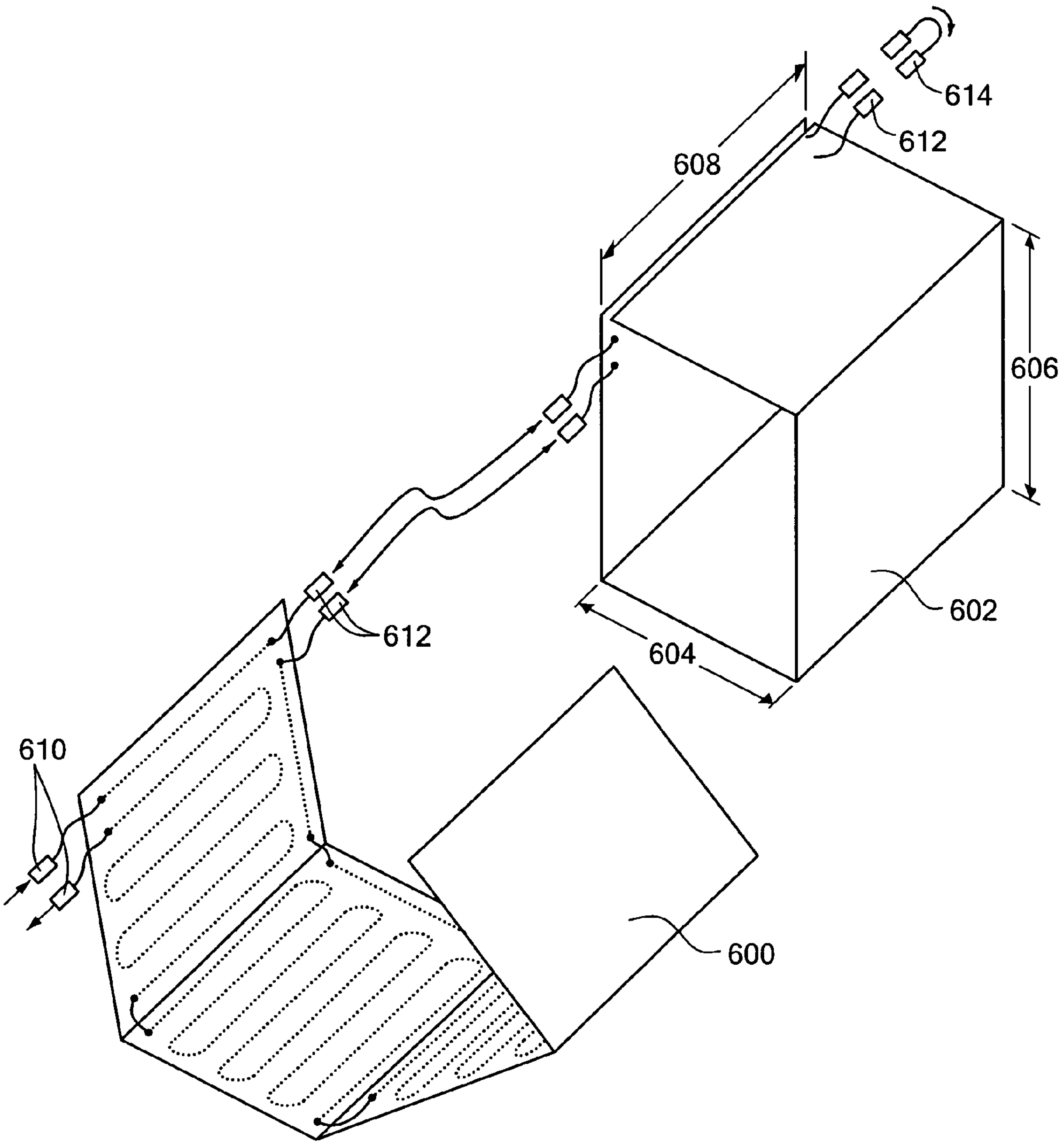
FIG. 6 is a perspective view of two modular liner units, according to another embodiment of the present invention.

As noted, ISO standard containers are available in various lengths. Many of these lengths are multiples of 10 or 20 feet. To avoid stocking liner sheets for each of these container lengths, an alternative embodiment, illustrated in FIG. 6, provides modular liner units, such as those shown at 600 and 602. The modular liner units 600–602 can include four (or another number of) hinged panels, as described above. Preferably, each modular liner unit 600–602 has a width 604 and a height 606 that corresponds to a dimension of a typical container. The length 608 of the modular units is chosen such that a whole number of modular units, placed end to end, can line any of several different size containers. For example, the length can be 9.8 feet or 19.8 feet. Such modular units can be easier to install than a single liner sheet (as shown in FIG. 5), because the modular units are smaller than a single liner sheet.

Each modular liner unit 600–602 preferably includes two sets of optical connectors 610 and 612, by which it can be connected to other modular units or to a detector circuit. A "loop back" optical jumper 614 completes the optical path by connecting to the optical connectors 612 of the last modular unit 602.

The panels can be manufactured from a variety of materials including cardboard, foamboard, plastic or composite materials or woven or non-woven fabric material. The optical fiber can be embedded into the panel or placed on a panel surface and covered with a protective coating or sheet.

Figure 7:
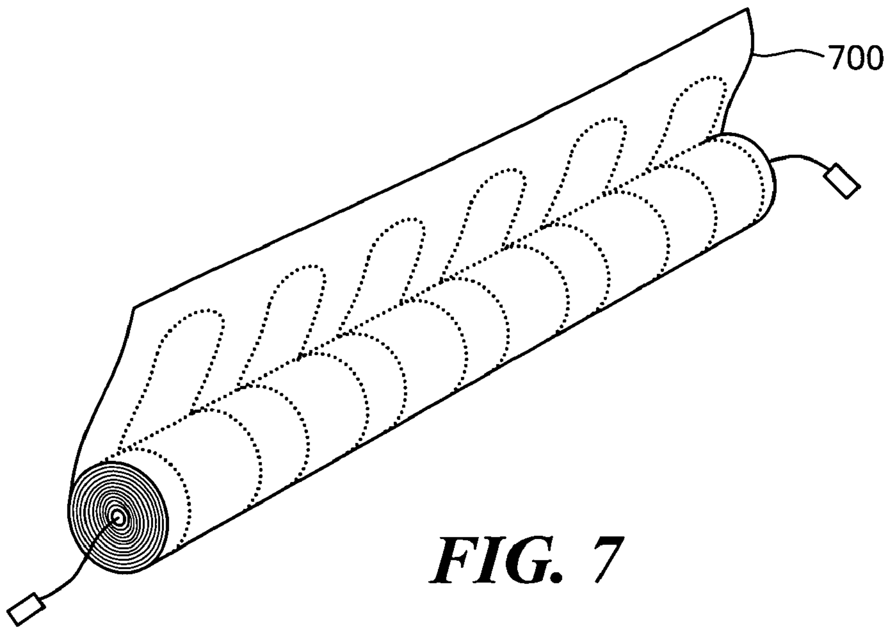
FIG. 7 is a perspective view of a flexible, rollable liner sheet, according to another embodiment of the present invention.

A liner sheet according to the present invention can be implemented in various forms. For example, rigid, semi-rigid and flexible panels have been described above, with respect to FIGS. 1 and 5. FIG. 7 illustrates another embodiment, in which a liner sheet 700 is made of a flexible, rollable material. The liner sheet 700 can be unrolled prior to installation in a container and later re-rolled for storage. Such a flexible liner sheet can be attached and connected as described above, with respect to rigid panels.

Figure 8:
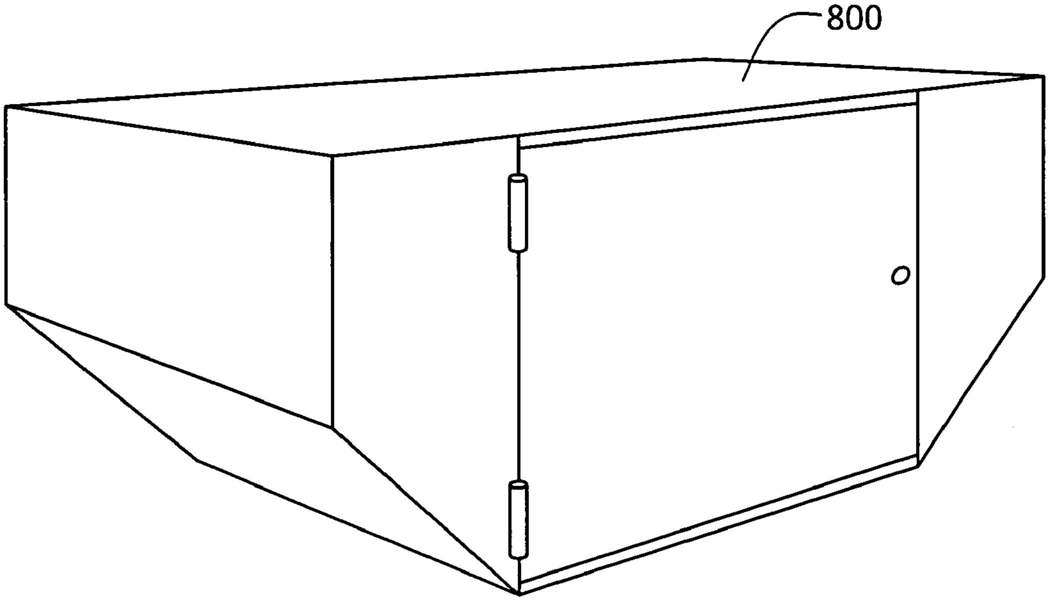
FIG. 8 is a perspective view of an aircraft container, in which an embodiment of the present invention can be advantageously practiced.

Although the present invention has thus far been described for use in ISO and other similar shipping containers, other embodiments can be used in other types of shipping containers or boxes. For example, FIG. 8 illustrates an LD3 container 800 typically used on some aircraft. Embodiments of the present invention can be sized and shaped for use in LD3, LD3 half size, LD2 or other size and shape aircraft containers or containers used on other types of transport vehicles or craft.

Figure 9:
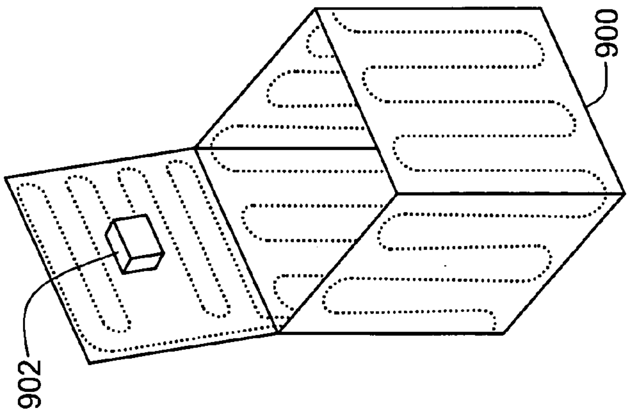
FIG. 9 is a perspective view of a box liner, according to another embodiment of the present invention.

Yet other embodiments of the present invention can be used in shipping boxes, such as those used to ship goods via Parcel Post® service. For example, FIG. 9 illustrates a liner sheet 900 that can be placed inside a box. The liner 900 can include a control circuit 902 that includes the detector circuit 204 (FIG. 2) and the associated other circuits described above. Such a liner sheet need not necessarily be attached to the interior surfaces of a box. The liner sheet 900 can be merely placed inside the box. Optionally, the control circuit 902 can include a data recorder to record, for example, a time and location of a detected breach. The control unit 902 can also include a transmitter, by which it can notify a central location, such as a shipper's operations center of its location and breach status.

Furthermore, as noted, embodiments of the present invention are not limited to rectangular containers, nor are they limited to containers with flat surfaces. For example, liner sheets can be bent, curved, shaped or stretched to conform to a surface, such as a curved surface, of a container.

Figure 10:
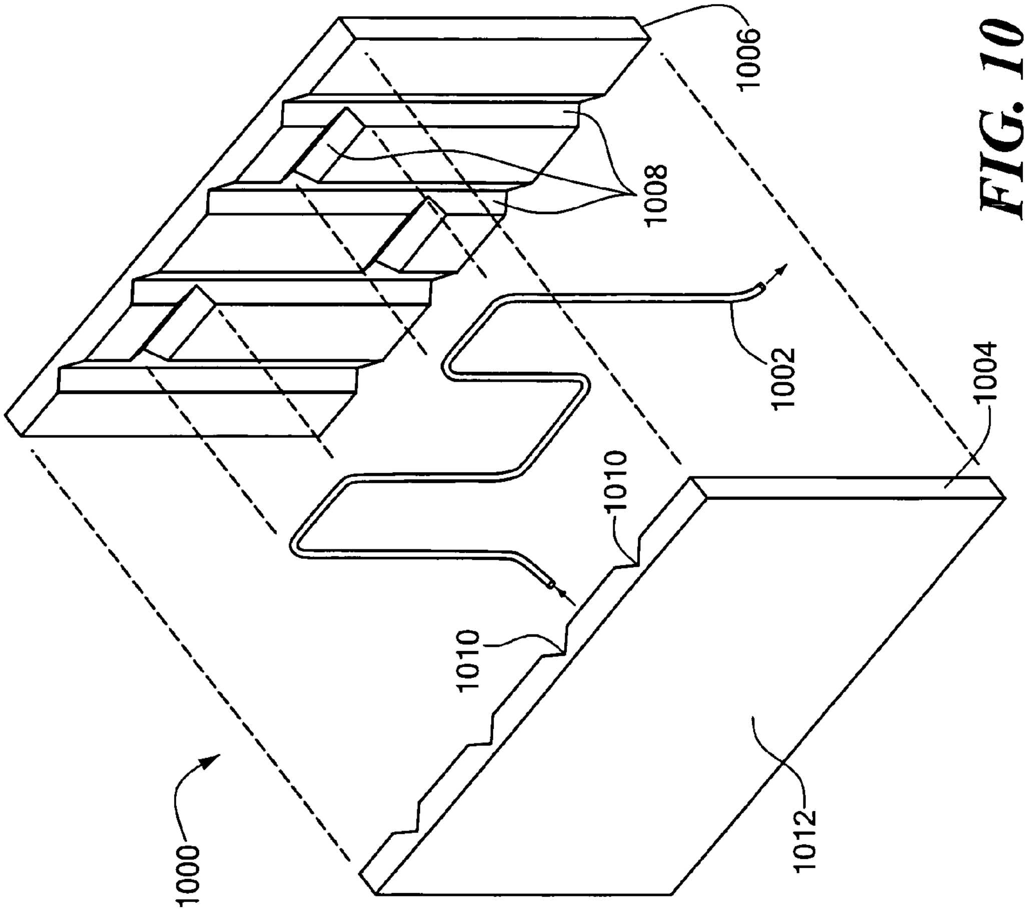
FIG. 10 is an exploded view of a rigid panel, according to one embodiment of the present invention.

As noted, a liner sheet according to the present invention can be implemented in various forms. FIG. 10 is an exploded view of one embodiment of a panel 1000 having an optical fiber 1002 sandwiched between two layers 1004 and 1006. One of the layers 1004 or 1006 can be a substrate, upon which the other layer is overlaid. A groove, such as indicated at 1008, is formed in one of the layers 1006, such as by scoring, cutting, milling, stamping or molding. Optionally, a corresponding groove 1010 is formed in the other layer 1004. The optical fiber 1002 is inserted in the groove(s) 1008(–1010), and the two layers 1004–1006 are joined. Alternatively, the optical fiber can be molded into a panel or sandwiched between two layers while the layers are soft, such as before they are fully cured. Optionally, a surface (for example surface 1012) of one of the layers can be made of a stronger material, or it can be treated to become stronger, than the rest of the panel 1000. When the panel 1000 is installed in a container, this surface 1012 can be made to face the interior of the container. Such a surface can better resist impact, and thus accidental damage, from cargo and equipment as the cargo is being loaded or unloaded.

Figure 11:
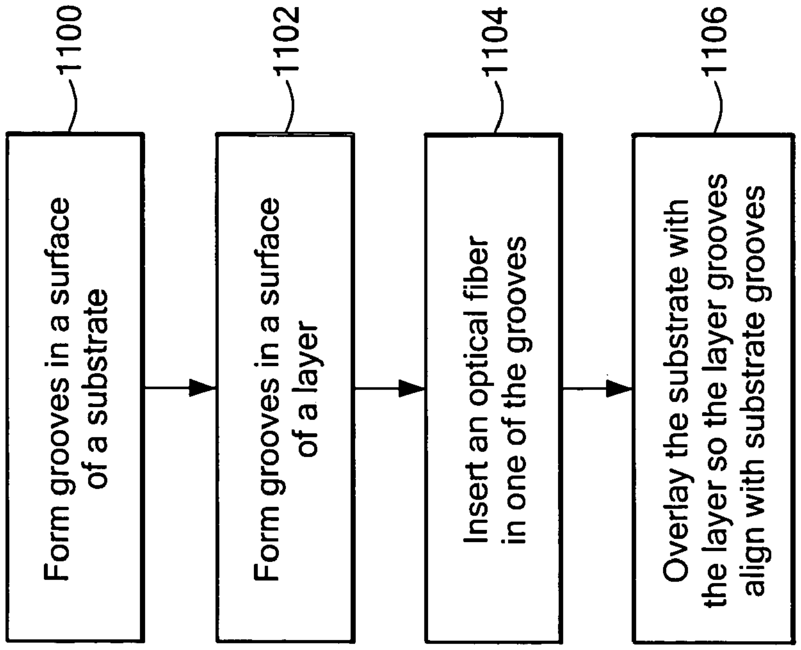
FIG. 11 is a simplified flowchart illustrating a process for fabricating a liner sheet, such as the one illustrated in FIG. 10.

FIG. 11 illustrates a process for fabricating a panel, such as the panel 1000 described above. At 1100, one or more grooves are formed in a substrate. At 1102, one or more grooves are formed in a layer that is to be overlaid on the substrate. At 1104, an optical fiber is inserted in one of the grooves. At 1106, the substrate is overlaid with the layer.

Figure 12:
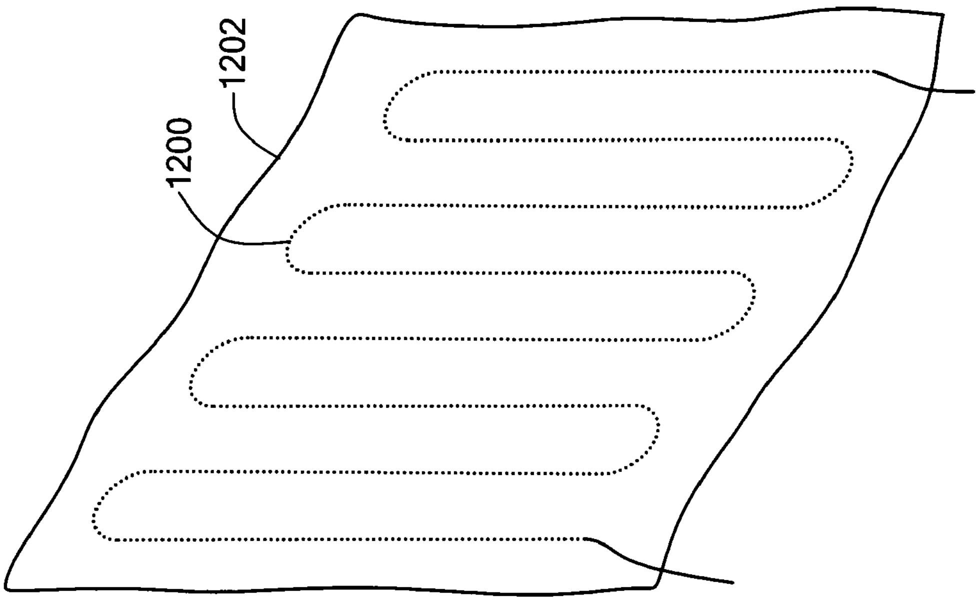
FIG. 12 is a perspective view of a fabric embodiment of a liner sheet, according to one embodiment of the present invention.
Figure 13:
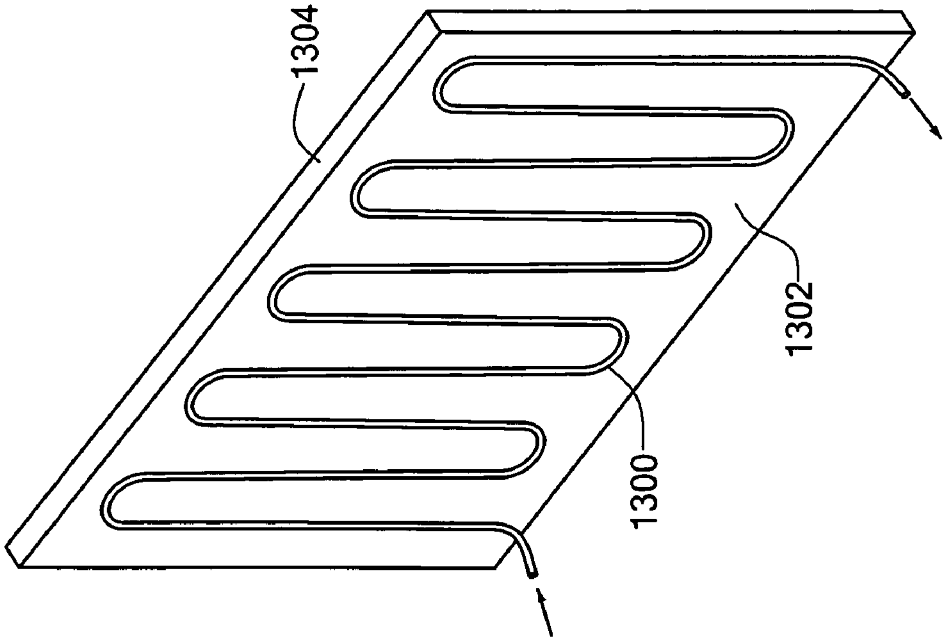
FIG. 13 is a perspective view of a liner sheet panel with an optical fiber attached to its surface, according to one embodiment of the present invention.

Thus far, panels with optical fibers embedded within the panels have been described. Alternatively, as illustrated in FIG. 12, an optical fiber 1200 can be woven into a woven or non-woven (such as spun) fabric 1202. In addition, an optical fiber can be woven or threaded through a blanket, carpet or similar material. As noted above, and as illustrated in FIG. 13, an optical fiber 1300 can be attached to a surface 1302 of a flexible or rigid panel 1304.

Figure 14:
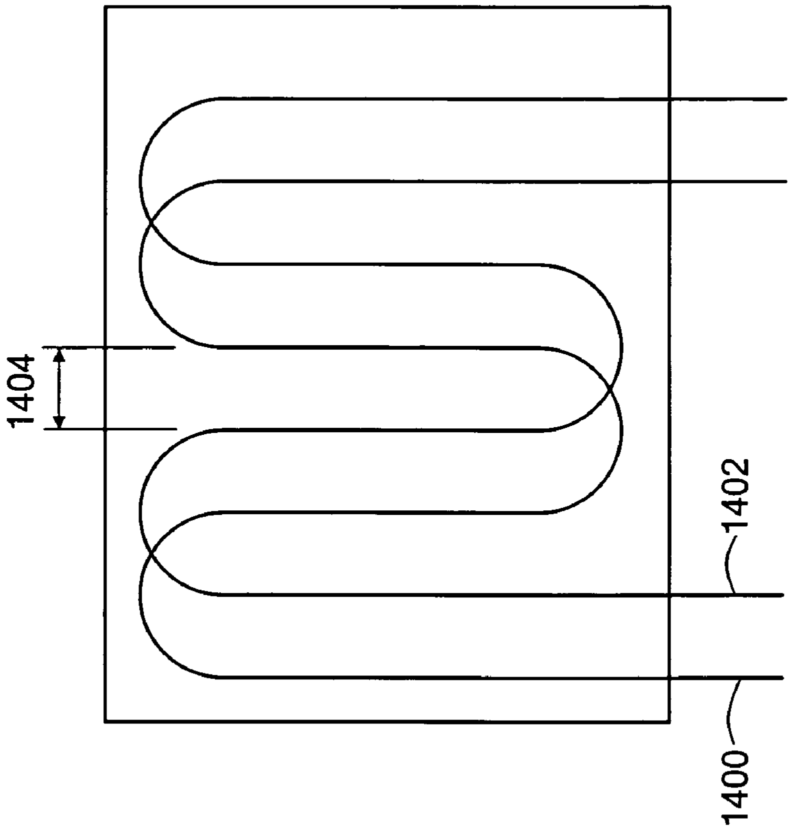
FIGS. 14 and 15 are plan views of liner sheets, each having more than one optical fiber, according to two embodiments of the present invention.
Figure 15:
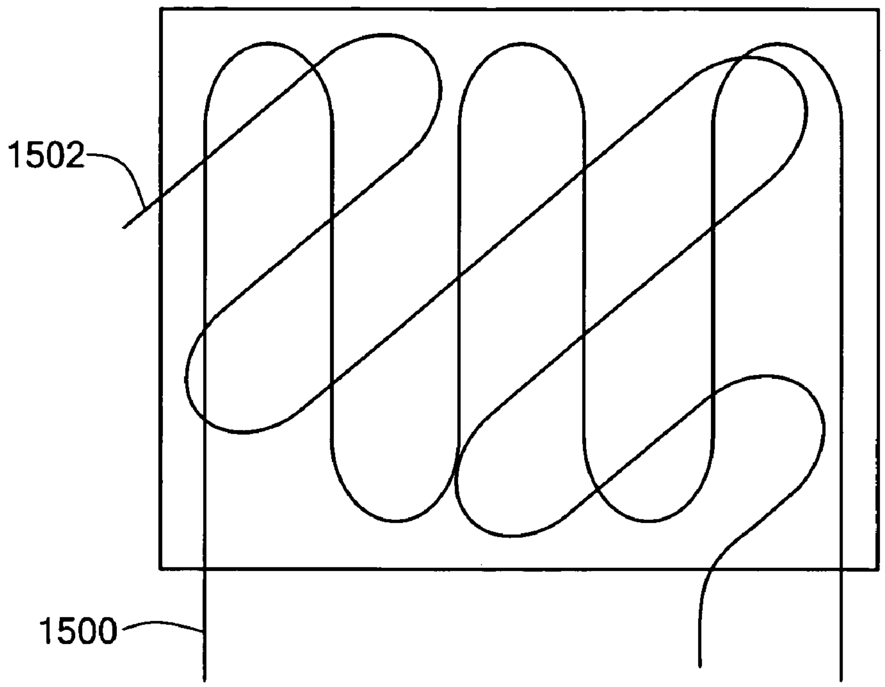

As noted, a pitch or spacing 108 between adjacent portions of the optical fiber 106 (FIG. 1) can be selected according to the minimum size breach in the container 100 that is to be detected. In the embodiment shown in FIG. 1, the spacing 108 is approximately equal to twice the radius of bend 116 in the optical fiber 106. However, many optical fibers have minimum practical bend radii. If such an optical fiber is bent with a radius less than this minimum, loss of light transmission through the bent portion of the optical fiber can occur. As shown in FIG. 14, to avoid such loss in situations where a pitch less than twice the minimum bend radius is desired, two or more optical fibers 1400 and 1402 can be can be interlaced. In such an embodiment, if N optical fibers are used and each optical fiber is bent at its minimun radius, the spacing (e.g. 1404) between the optical fibers can be approximately 1/N the minimum spacing of a single optical fiber. The optical fibers can be approximately parallel, as shown in FIG. 14, or they can be non-parallel. For example, as shown in FIG. 15, the optical fibers 1500 and 1502 can be disposed at an angle with respect to each other. Alternatively (not shown), two liner sheets can be used, one on top of the other, to line a single surface of a container. The optical fibers of these two liner sheets can, for example, be oriented at an angle to each other, offset from each other or otherwise to provide a tighter pitch than can be provided by one liner sheet alone or to provide redundant protection, such as for especially sensitive cargo.

Figure 16:
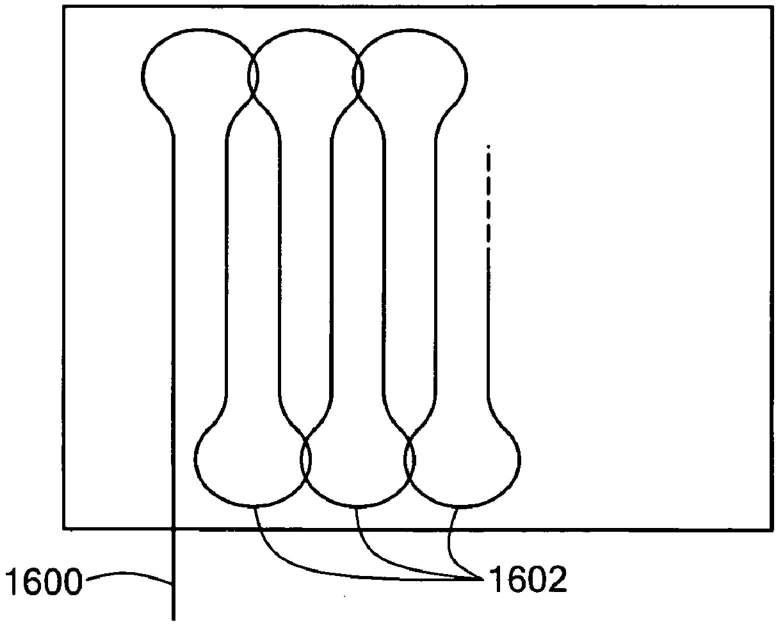
FIGS. 16, 17, 18 and 19 are plan views of liner sheets, each having one optical fiber, according to four embodiments of the present invention.
Figure 17:
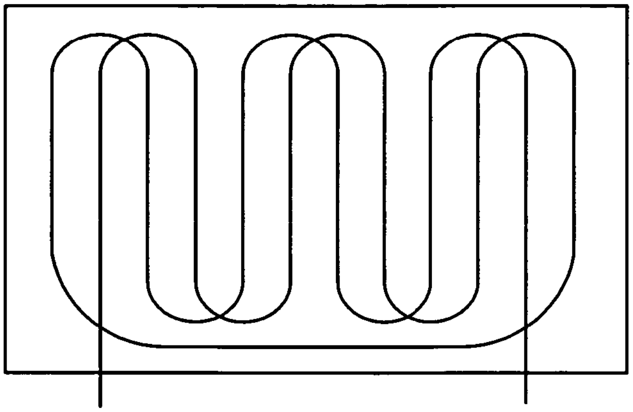
Figure 18:
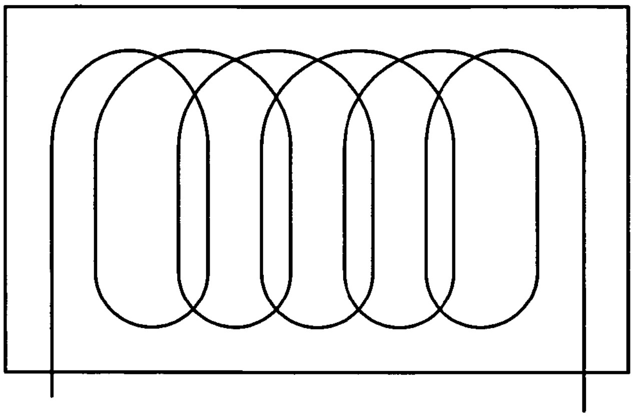
Figure 19:
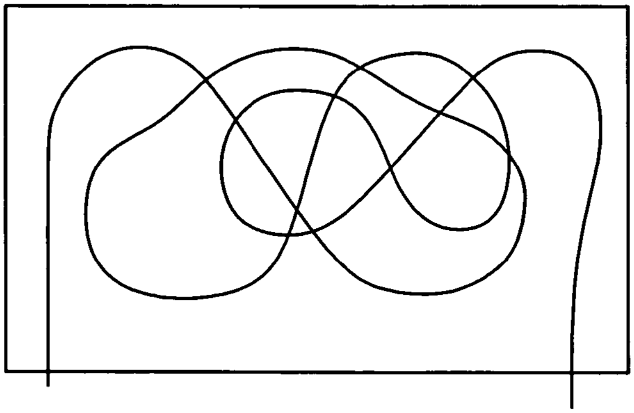

In another embodiment shown in FIG. 16, a single optical fiber 1600 can be configured so loops, such as those shown at 1602, at the ends of the optical fiber segments each occupy more than 180° of curvature and, thus, provide a reduced spacing. Other configurations of a single optical fiber providing a reduced spacing are shown in FIGS. 17, 18 and 19.

Figure 20:
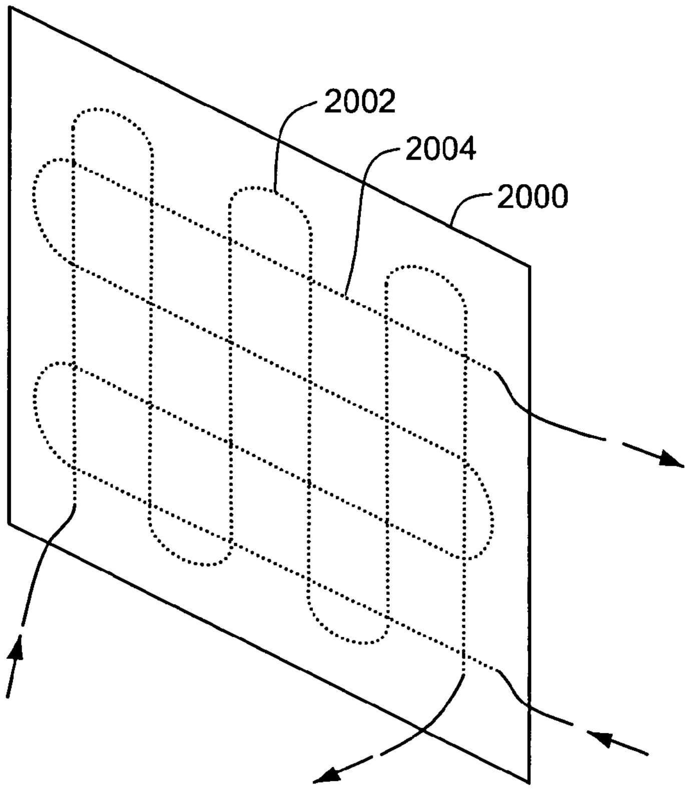
FIG. 20 is a perspective view of a liner sheet having more than one optical fiber, according to one embodiment of the present invention.
Figure 21:
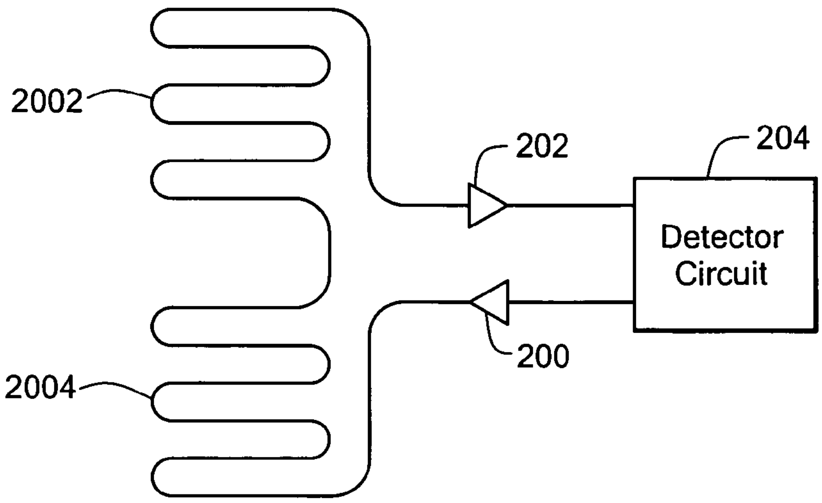
FIG. 21 is a simplified schematic diagram of the liner sheet of FIG. 14 and associated circuitry, according to one embodiment of the present invention.

As noted, more than one optical fiber can be included in each liner sheet. FIG. 20 shows a liner sheet 2000 with two optical fibers 2002 and 2004. As shown in FIG. 21, the optical fibers 2002, 2004 can be connected to each other in series, and the respective optical fibers can be connected to a single light source 200 and a single light detector 202. Alternatively (not shown), the optical fibers 2002, 2004 can be connected to each other in parallel, and the optical fibers can be connected to a single light source and a single light detector.

Figure 22:
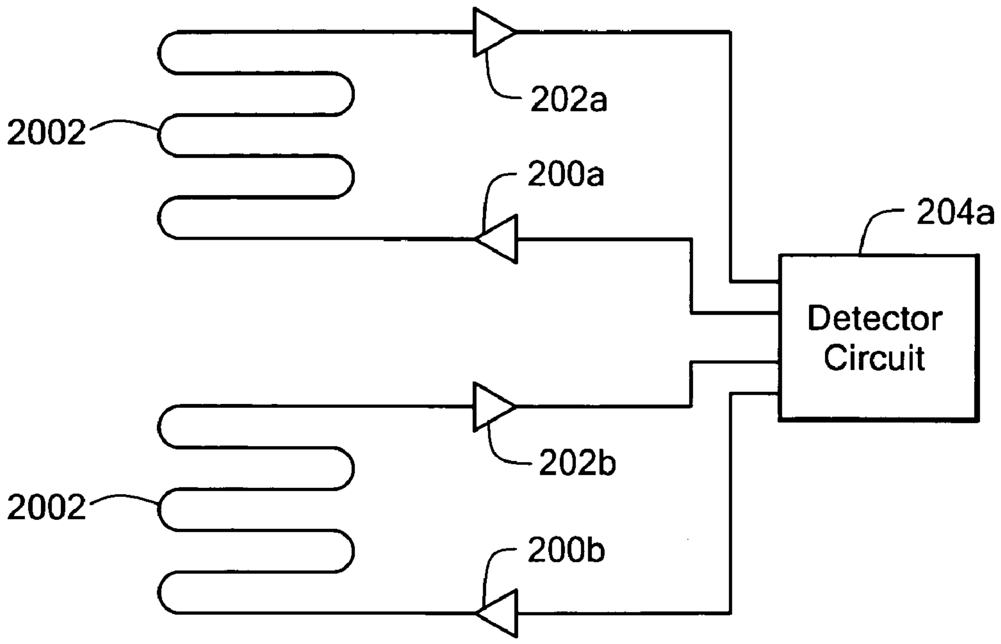
FIG. 22 is a simplified schematic diagram of the liner sheet of FIG. 14 and associated circuitry, according to another embodiment of the present invention.

In an alternative embodiment shown in FIG. 22, each optical fiber 2002, 2004 can be connected to its own light source 200*a* and 200*b* (respectively) and its own light detector 202*a* and 202*b* (respectively). In this case, signals from the optical fibers 2002, 2004 can be processes in series or in parallel by a detector circuit 204*a*.

A parallel connection of the optical fibers 2002, 2004, or a parallel processing of the signals from the optical fibers, would tolerate some breakage of the optical fibers without triggering an alarm. Such breakage might be expected, due to rough handling that the panels might undergo as containers are loaded and unloaded. The amount of light transmitted by several parallel optical fibers depends on the number of the optical fibers that remain intact. Once a container is loaded, the system could sense which fibers are intact and ignore damaged or severed fibers. Alternatively, the system could sense the amount of light being transmitted and set that amount as a reference amount. Later, in transit, if the amount of transmitted light fell below the reference amount, the system could signal a breach or shift in cargo, as discussed above. Of course, not all the optical fibers need be used at one time. Some of the optical fibers can be left as spares and used if primary optical fibers are damaged.

Figure 23:
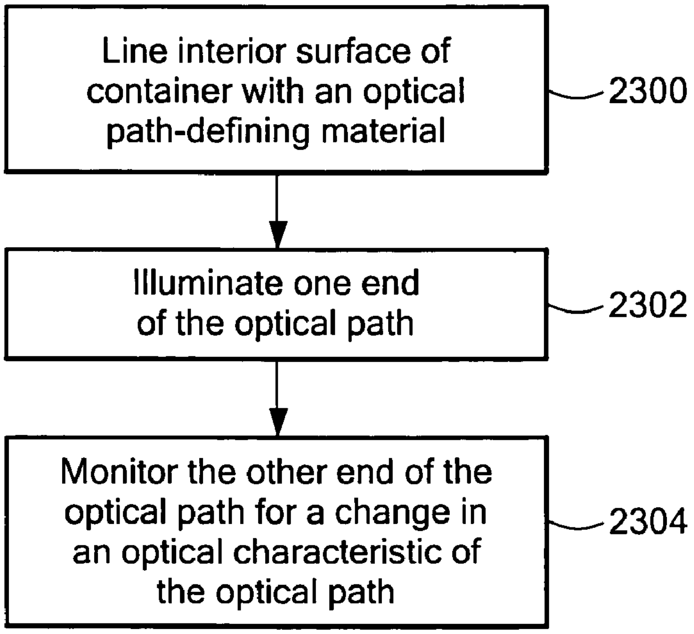
FIG. 23 is a simplified flowchart of a method of monitoring a container, according to one embodiment of the present invention.

Any of the above-described liner sheets or variations thereon can be used to monitor a container. FIG. 23 illustrates a process for monitoring a container. At 2300, at least one interior surface, or a portion thereof, is lined with an optical path-defining material. At 2302, one end of the optical path is illuminated. At 2304, the other end of the optical path is monitored for a change in an optical characteristic of the optical path.

In an alternative implementation, a thin electrical wire or path can be utilized rather than the optical fiber described above. For example, a thin electrical wire can be arranged in a zigzag path across the area of a panel, or can be woven into a fabric to provide the breakage detection similar to that of the fiber optic embodiment described above. An electrical signal or energy source and electrical detector would be employed with the conductive wire to detect a break in the conductive path.

While the invention has been described with reference to a preferred embodiment, those skilled in the art will understand and appreciate that variations can be made while still remaining within the spirit and scope of the present invention, as described in the appended claims. For example, although some embodiments were described in relation to shipping containers used to transport cargo, these containers can also be used to store cargo in warehouses, yards and the like, as well as during loading and unloading of the containers at a loading dock. Some embodiments were described in relation to shipping containers used on ships, etc. These and other embodiments can also be used with shipping boxes and other types of containers. The invention can also be used to detect tampering with, or a break into or out of, a room of a structure, such as an office, vault or prison cell. The term “container” in the claims is, therefore, to be construed broadly to include various types of shipping containers and boxes, as well as rooms. In addition, the optical paths have been described as being created using optical fibers. Other mechanisms can, however, be used to create optical paths. For example, hollow tubes and mirrors or combinations of technologies can be used to define optical paths through panels.

What is claimed is:

1. A tamper detection system for a multisided shipping container, comprising:

a plurality of liner panels, each sized to line an interior wall of a respective side of the shipping container;

each of the liner panels having an optical fiber embedded therein and extending in a path across substantially the entire area of the panel, the optical fiber having a first end and a second end; and each of the liner panels having a first coupler connected to the first end of the optical fiber and a second coupler connected to the second end of the optical fiber;

wherein at least one of the couplers of each panel is operative to interconnect to at least one of the couplers of another panel to provide a continuous path through the interconnected optical fibers of the interconnected panels; and wherein at least one of the plurality of liner panels has at least one hingable region extending across the panel to define at least two foldable portions of the panel.

2. The tamper detection system of claim 1, further comprising:

a circuit configured to detect a change in an optical characteristic of the continuous path.

3. The tamper detection system of claim 2, further comprising:

a light source optically connected to one end of the continuous path; and a light detector optically connected to another end of the continuous path, wherein the circuit uses a signal from the light detector to detect the change in the optical characteristic of the continuous path.

4. The tamper detection system of claim 3, further comprising an alarm connected to the circuit, the circuit being configured to activate the alarm if the circuit detects the change in the optical characteristic of the continuous path.

5. The tamper detection system of claim 2, further comprising:

a wireless transmitter connected to the circuit and configured to transmit a signal if the circuit detects the change in the optical characteristic of the continuous path.

6. The tamper detection system of claim 5, further comprising:

a wireless receiver configured to receive the signal; and an alarm connected to the wireless receiver and configured to provide an indication if the optical characteristic of the continuous path changes.

7. The tamper detection system of claim 2, further comprising a wireless system aboard a vessel configured to notify a port system of an approach of the vessel, the wireless system being further configured to notify the port system if the optical characteristic of the continuous path has changed.

8. The tamper detection system of claim 1, wherein the optical fiber of each liner panel is woven into the respective liner panel.

9. The tamper detection system of claim 1, wherein each liner panel comprises a carpet.

10. The tamper detection system of claim 1, wherein each liner panel comprises a semi-rigid panel.

11. The tamper detection system of cLaim 1, wherein each optical fiber is molded into the respective liner panel.

12. The tamper detection system of claim 1, wherein each optical fiber is sandwiched between two layers of the respective liner panel.

13. The tamper detection system of claim 1, wherein each optical fiber is attached to a surface of the respective liner panel.

14. The tamper detection system of claim 1, wherein each liner panel comprises a rigid panel.

15. The tamper detection system of claim 1, wherein at least one of the liner panels comprises a plurality of hinged panels.

16. The tamper detection system of claim 1, wherein the plurality of liner panels comprises six panels.

17. The tamper detection system of claim 1. wherein the container is a rectangular shipping container.

18. The tamper detection system of claim 1, wherein the container is an aircraft shipping container.

19. The tamper detection system of claim 1, wherein the container includes at least one curved surface.

20. The tamper detection system of claim 1, wherein at least one of the plurality of liner panels includes a second optical fiber extending across at least a portion of the area of liner panel, the second optical fiber providing a second optical path.

21. The tamper detection system of claim 20 wherein the two optical fibers are optically connected together in series to form an extended optical path; and further comprising:

a light source optically connected to an end of the extended optical path;

a light detector optically connected to the other end of the extended optical path; and a circuit connected to the light detector and configured to activate an alarm if an optical characteristic of the optical path of either optical fiber changes

22. The tamper detection system of claim 20, wherein the two optical fibers are optically connected together in parallel; and further comprising:

a light detector circuit connected to the two optical fibers and configured to activate an alarm if an optical characteristic of both optical fibers changes.

23. The system of claim 1, wherein the optical fiber of each of the plurality of liner panels extends in a serpentine path across substantially the entire area of the panel.

24. The system of claim 23, wherein the spacing between adjacent portions of the optical fiber is of a smaller size than a breach that could comprise the security of the container.

25. The system of claim 23, wherein the spacing between adjacent portions of the optical fiber is sufficiently small to cause breakage or degradation of the optical fiber in reaction to an attempted breach of the panel.

26. The system of claim 1, wherein:

at least one of the first and second couplers of at least one of the plurality of liner panels is operative to be coupled to a light source; and at least one of the first and second couplers of at least one of the plurality of liner panels is operative to be coupled to a light detector.

27. The system of claim 1, wherein the first end and the second end of the optical fiber of each of the plurality of liner panels is each at an edge of the panel.

28. The system of claim 1,wherein each of the plurality of liner panels is rectangular.

29. The system of claim 1, wherein the optical fiber of each of the plurality of liner panels is non-woven into the respective panel.

30. The system of claim 1, wherein each of the interior walls of the shipping container is lined by a respective one of the plurality of liner panels.

31. A method of detecting tampering with a multisided shipping container or the presence of a substance within the container, comprising:

lining the interior surface of each wall of the shipping cantainer with a panel sized for the respective interior surface and that has an optical fiber embedded therein and extending in a path across substantially the entire area of the panel, wherein at least one of the liner panels has at least one hingable region extending across the panel to define at least two foldable portions of the panel;

providing couplers connected to the respective ends of the optical fiber of each panel;

interconnecting the couplers to interconnect the optical fibers of the panels to provide a continuous path;

monitoring the continuous path for a change in an optical characteristic thereof, wherein the change in the optical characteristic is caused by the tampering with the container or by the presence of the substance within the container.

32. The method of claim 31, further comprising: responsive to a change in the optical characteristic of the continuous path, activating an alarm.

33. The method of claim 31, further comprising: responsive to a change in the optical characteristic of the continuous path, sending a wireless signal.

34. The method of claim 31, wherein monitoring the continuous path comprises:

illuminating one end of the continuous path; and detecting a change in an optical characteristic of the illumination at the other end of the optical fiber.

35. The method of claim 34, wherein detecting the change in the optical characteristic of the illumination at the other end of the optical fiber comprises detecting a decrease in the illumination.

36. The method of claim 34, further comprising:

responsive to detecting the change in the optical characteristic of the illumination, activating an alarm.

37. The method of claim 31, wherein the optical fiber of at least one of the panels is such that an optical characteristic of the optical fiber of the continuous path is affected by nuclear radiation impinging on the optical fiber.

38. The method of claim 31, wherein the optical fiber of at least one of the panels is such that an optical characteristic of the optical fiber of the continuous path is affected by gamma radiation impinging on the optical fiber.

39. The method of claim 31, wherein the optical fiber of at least one of the panels is such that a light-carrying capacity of the optical fiber is affected by nuclear radiation impinging on the optical fiber.

40. The method of claim 31, wherein the optical fiber of at least one of the panels is such that a light-canying capacity of the optical fiber is affected by gamma radiation impinging on the optical fiber.

41. The method of claim 31, wherein monitoring the continuous path comprises monitoring the continuous path for a decrease in a light-carrying capacity thereof.

42. The method of claim 31, wherein the optical fiber is such that an optical characteristic of the optical fiber of the continuous path is affected by radiation impinging thereon.

43. The method of claim 31, wherein the continuous path is such that the optical characteristic of the continuous path is affected by nuclear radiation impinging thereon.

44. The method of claim 31, wherein the continuous path is such that the optical charcteristic of the continuous path is affected by gamma radiation impinging thereon.

45. The method of claim 31, wherein the continuous path is such that a light-carrying capacity characteristic of the continuous path is affected by nuclear radiation impinging thereon.

46. The method of claim 45, wherein monitoring the continuous path comprises monitoring the continuous path for a decrease in light-carrying capacity of the continuous path.

47. The method of claim 31, wherein the continuous path is such that a light-carrying capacity characteristic of the continuous path is affected by gamma radiation impinging thereon.

48. The method of claim 31, wherein the optical characteristic of the continuous path is a light-carrying capacity of the optical fiber, and the light-carrying capacity of the optical fiber is reduced by gamma radiation impinging thereon.

49. A tamper detection system for a multisided container, comprising: a plurality of liner panels, each sized to line an interior wall of a respective side of the container;

each of the liner panels having an optical fiber embedded therein and extending in a path across substantially the entire area of the panel, the optical fiber having a first end and a second end;

each of the liner panels having a first coupler connected to the first end of the optical fiber and a second coupler connected to the second end of the optical fiber;

wherein at least one of the couplers of each panel is operative to interconnect to at least one of the couplers of another panel to provide a continuous path through the interconnected optical fibers of the interconnected panels; and wherein at least one of the plurality of liner panels has at least one hingable region extending across the panel to define at least two foldable portions of the panel: and further comprising:

a location determining system; and a circuit connected to the location determining system and configured to: detect a change in an optical characteristic of the continuous path; and, if the circuit detects the change in the optical characteristic of the continuous path, determine the location of the container.

50. A radiation detection system for a multisided shipping container, comprising:

a plurality of liner panels, each sized to line an interior wall of a respective side of the shipping container;

each of the liner panels having an optical fiber embedded therein and extending in a path across substantially the entire area of the panel, the optical fiber having a first end and a second end; wherein:

the optical fiber is such that an optical characteristic of the optical fiber is affected by radiation impinging on the optical fiber;

each of the liner panels has a first coupler connected to the first end of the optical fiber and a second coupler connected to the second end of the optical fiber, at least one of the couplers of each panel is operative to interconnect to at Least one of the couplers of another panel to provide a continuous path through the interconnected optical fibers of the interconnected panel; and wherein at least one of the plurality of liner panels has at least one hingable region extending across the panel to define at least two foldable portions of the panel.

51. The radiation detection system of claim 50, wherein the affect on the optical characteristic is a decrease in light-carrying capacity.

52. The radiation detection system of claim 51, wherein the radiation includes gamma radiation.

53. The radiation detection system of claim 51, wherein the radiation includes neutron radiation.

54. The radiation detection system of claim 50, wherein the radiation includes nuclear radiation.

55. The radiation detection system of claim 50, wherein the radiation includes gamma radiation.

56. The radiation detection system of claim 50, wherein the radiation includes neutron radiation.

57. The radiation detection system of claim 50, further comprising: a circuit configured to detect the affect on the optical characteristic of the optical fiber.

58. The radiation detection system of claim 57, further comprising: a light source optically connected to one end of the continuous path; and a light detector optically connected to another end of the continuous path, wherein the circuit uses a signal from the light detector to detect the affect on the optical characteristic of the optical fiber.

59. The radiation detection system of claim 58, further comprising an alarm connected to the circuit, the circuit being configured to activate the alarm if the circuit detects the affect on the optical characteristic of the optical fiber.

* * * * *

UNITED STATES PATENT AND TRADEMARK OFFICE

CERTIFICATE OF CORRECTION

PATENT NO. : 7,098,444 B2
APPLICATION NO. : 10/837883
DATED : August 29, 2006
INVENTOR(S) : Gilbert D. Beinhocker It is certified that error appears in the above-identified patent and that said Letters Patent is hereby corrected as shown below:

Column 11, line 63, claim 11, “cLaim” should read --claim--;

Column 13, line 5, claim 31, “cantainer” should read --container--; and

Column 13, line 53, claim 40, “canying” should read --carrying--.

Signed and Sealed this

Twentieth Day of February, 2007

JON W. DUDAS
*Director of the United States Patent and Trademark Office*